United States Patent
Andersen et al.

(10) Patent No.: US 7,241,192 B2
(45) Date of Patent: Jul. 10, 2007

(54) HYBRID SHIP PROPULSION SYSTEM

(75) Inventors: Peter Andersen, Hamburg (DE); Wolfgang Rzadki, Glinde (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/492,796

(22) PCT Filed: Dec. 5, 2001

(86) PCT No.: PCT/DE01/04556

§ 371 (c)(1), (2), (4) Date: Jan. 18, 2005

(87) PCT Pub. No.: WO02/47974

PCT Pub. Date: Jun. 20, 2002

(65) Prior Publication Data

US 2005/0106953 A1  May 19, 2005

(30) Foreign Application Priority Data

Dec. 11, 2000 (DE) ................................ 100 61 578

(51) Int. Cl.
 *B63H 21/22* (2006.01)
(52) U.S. Cl. ................... 440/1; 440/3; 440/6
(58) Field of Classification Search .......... 114/40; 440/1, 3, 6, 50
See application file for complete search history.

(56) References Cited

U.S. PATENT DOCUMENTS

| 1,206,254 A | * | 11/1916 | Roellig | 440/6 |
| 1,899,550 A | * | 2/1933 | Beekman | 60/711 |
| 3,530,814 A | * | 9/1970 | Begunkov et al. | 114/40 |
| 5,616,056 A | | 4/1997 | Meissner | |

FOREIGN PATENT DOCUMENTS

| CA | 1 266 205 | * | 2/1990 |
| DE | 35 31 990 A1 | | 3/1987 |
| DE | 44 32 483 A1 | | 3/1996 |
| DE | 296 04 437 U1 | | 6/1996 |
| EP | 0 217 049 A1 | | 4/1987 |
| JP | 4-46892 A | | 2/1992 |
| JP | 7-132885 A | | 5/1995 |

OTHER PUBLICATIONS

"Elektronik wählt im Hybrid-Pkw automatisch die günstigste Antriebsart" Nr. 20, 20 Mai 1994.
"Booster Drive Adds Another Cylinder", MOTORSHIP, The Reed Business Information LTD., Sutton, GB, vol. 80, No. 952, Nov. 1999, p. 25 XP000877915.

* cited by examiner

*Primary Examiner*—Sherman Basinger
(74) *Attorney, Agent, or Firm*—Harness, Dickey & Pierce, P.L.C.

(57) ABSTRACT

A hybrid propulsion system includes a main diesel engine for driving the marine turbine and an electric motor. The electric motor has a nominal output that constitutes at least 20% of the nominal output of the main diesel engine. The electric motor remains continuously switched on and maintains, together with a variable-pitch propeller, the main diesel engine at a favorable operating point. The combination of the main diesel engine and the electric motor also allows for a more economical design or operation of the propulsion system.

14 Claims, 2 Drawing Sheets

HYBRID SHIP PROPULSION SYSTEM

This application is the national phase under 35 U.S.C. § 371 of PCT International Application No. PCT/DE01/04556 which has an International filing date of Dec. 5, 2001, which designated the United States of America and which claims priority on German Patent Application numbers DE 100 61 578.3 filed Dec. 11, 2000, the entire contents of which is hereby incorporated herein by reference.

BACKGROUND OF THE INVENTION

The propulsion system for large cargo ships, for example container ships, normally provides one slow-running diesel engine for each ship propeller. This slow-running diesel engine supplies all the propulsion power for this propeller. The propulsion power of the diesel engine starts at about 10 to 15 MW. The diesel engines that are used operate on the two-stroke principle. The high power that is required and the low rated rotation speed result in a large swept volume, and thus a large physical volume with a large mass.

A correspondingly large amount of space must be provided in the ship's hull for the diesel engine or, for a multishaft propulsion system, the diesel engines, to be precise at a point which is located close to the stern with respect to the overall length. The engine room is located at a point which intrinsically would be particularly highly suitable for being loaded with containers. There is also a large amount of unused dead space.

Because of the heavy weight of the diesel engine, the hull must be reinforced to a considerable extent at the relevant points.

As in the case of all internal combustion engines, the relative fuel consumption also varies in the case of ship diesel engines as a function of the operating point, that is to say of the rotation speed. The rotation speed range which is best with regard to the fuel consumption occurs at about 85 to 90% of the rated rotation speed for which the diesel engine is designed. At lower rotation speeds, the fuel consumption can be even worse. The ship's captain must therefore keep the propulsion system as close as possible to this optimum operating point.

Variable-pitch propellers, in which the angle of the blades of the ship propeller can be controlled as a function of the torque, provide a certain capability to vary the operation point in the direction of better fuel consumption, even in poor load situations. Nevertheless, the optimum operating point cannot be achieved in all movement conditions.

In addition to the poor fuel consumption at rotation speeds below the rated rotation speed, considerable thermal loads also occur at low rotation speeds, such as those which are required in the lower speed of motion range when the ship is being accelerated. In order to accelerate the ship, the diesel engine has to emit a high torque at a low rotation speed, that is to say it runs at a low rotation speed with a high cylinder charge. The thermal load on the cylinder heads is correspondingly high.

Despite all these disadvantages, the ship diesel engine in container ships is used virtually exclusively, since its procurement costs are very low. The diesel engine is robust and can be produced in countries with low wages, which reduces the production costs.

Besides the diesel drive for ships, it is also known from practice for electric motors to be used for driving the ship propeller. The electrical power for the propeller motor is produced by means of a diesel generator system. High-speed four-stroke diesel engines can be used in this case, which have a considerably better power-to-weight ratio than slow-running diesel engines. Their rotation speed is higher by a factor of approximately 4 to 10 than the rotation speed of the diesel engine for the ship propeller.

Furthermore, converters based on semiconductors can be used to always operate the diesel engine for the diesel generator system independently of the load at that rotation speed at which the fuel consumption with respect to the output power is optimum. This propulsion system concept makes it possible to avoid thermal problems resulting from low rotation speeds and high cylinder charges.

The considerable advantages of an electrical propulsion system are countered by comparatively high investment costs, which are considerably greater than the costs involved for a diesel engine that drives the ship propeller directly.

Finally, a mixed propulsion system is known from practice, which provides a slow-running diesel engine for the ship propeller as the main propulsion device. In addition, a comparatively small electric motor is coupled to the propeller shaft, as a booster. The electric motor power is at most 10% of that of the diesel engine.

The booster motor is used in particular in the low rotation speed range in order to avoid thermally overloading the main propulsion system diesel. A further purpose of the booster motor is to improve the control system dynamic response, for example in operating situations when the propeller is partially moving in and out of the water owing to heavy sea states.

SUMMARY OF THE INVENTION

Against this background, an object of an embodiment of the invention is to provide a ship propulsion system which is more economic overall than the known systems. Preferably, this is from the viewpoint of fuel consumption in operation, of the available useful area, and/or the investment costs for the ship's hull and the propulsion system during construction of the ship.

According to an embodiment of the invention, this object is achieved by a ship propulsion system.

The ship propulsion system according to an embodiment of the invention uses a combination of an electrical drive and a diesel drive for the ship propeller. The electric motor is relatively large and provides a significant proportion of the total propeller torque with respect to the torque which is supplied by the diesel engine. Nonetheless, when considered overall, the electrical power of the electric motor is still relatively small, so that the investment costs can be kept low, compared to a propulsion system operating entirely with electric motors.

The electric motor replaces, so to speak, one or more cylinders of the slow-running diesel engine, which becomes correspondingly shorter and lighter, compared to a ship in which this propulsion power originates exclusively from a slow-running diesel engine. The reduction in volume and mass for the main diesel is greater than the weight and space required for the electric motor and its power supply. Both the electric motor and its power supply can be accommodated in the dead space which would otherwise exist within the engine room.

The reduction in the space required for the main diesel engine, compared to a propulsion system in which the propulsion power is provided mainly by the slow-running diesel engine, considerably increases the cargo capacity without changing the ship dimensions.

Furthermore, the diesel generator system can be accommodated virtually anywhere in the ship's hull, that is to say even at points which are not particularly well suited in any case for accommodating containers or other cargo.

The mixed propulsion system with the relatively high electrical propulsion power, in conjunction with the variable-pitch propeller, now also makes it possible to achieve an advantageous regulated fuel consumption by the main diesel engine in virtually all operating situations.

In particular, it is possible to overcome the thermal load on the main diesel engine during starting and acceleration of the ship, thus considerably improving the life and reducing the amount of maintenance work for the main diesel engine.

The new propulsion system concept is also suitable for conversion or upgrading of existing ships, without needing to enlarge the engine room.

By way of example, this propulsion system concept allows a seagoing ship to be converted to a ship which can pass through ice, or even to an ice-breaking cargo ship. All that is necessary for this purpose is to reinforce the hull in the appropriate areas of the bow and of the bottom of the ship, as well as the flanks, for ice operation.

Virtually no changes are required to the main diesel for the propeller shaft or shafts. In particular, the power is increased without enlarging the engine room.

The shaft system is upgraded as appropriate for the greater total propulsion power, and the additional electrical propulsion system is installed. The space required for the additional electric motor and for the diesel generator system is small with respect to the dead space available in the engine room. The additional devices can generally be accommodated without any problems.

The new propulsion concept also makes it possible to give an existing container ship or cargo ship a higher cruise speed. For this purpose, as mentioned above, the shaft system is reinforced, possibly with a variable-pitch propeller being fitted, and the propeller shaft being provided with the electric motor. In this case as well, the diesel generator system can be accommodated in the engine room or at some other point, once again without any difficulties.

A ship that has been converted in this way is able to achieve higher cruise speeds when moving freely, without any changes to the external dimensions.

It is also possible to use the new propulsion system concept to enlarge the cargo volume rather than to increase the cruise speed when moving freely of a cargo ship, if this is what is required. This is done by lengthening the ship's hull to correspond to the desired volume. The main diesel is retained, and is assisted in the manner according to the invention by an electrical propulsion system. There is no need to enlarge the engine room in this case either, that is to say the main diesel remains in the same place. It is sufficient to match the shaft system to the increased torque, to provide a variable-pitch propeller and to install the diesel generator system.

As is evident, upgrading can be carried out in one of the directions mentioned above at any time comparatively easily, without any major changes being required in the area of the engine room or of the main diesel engine or engines.

BRIEF DESCRIPTION OF THE DRAWINGS

Further advantages, features and details of the invention will become evident from the description of illustrated exemplary embodiments given hereinbelow and the accompanying drawings, which are given by way of illustration only and thus are not limitative of the present invention, wherein.

DETAILED DESCRIPTION OF THE PREFERRED EMBODIMENTS

Figure 1:
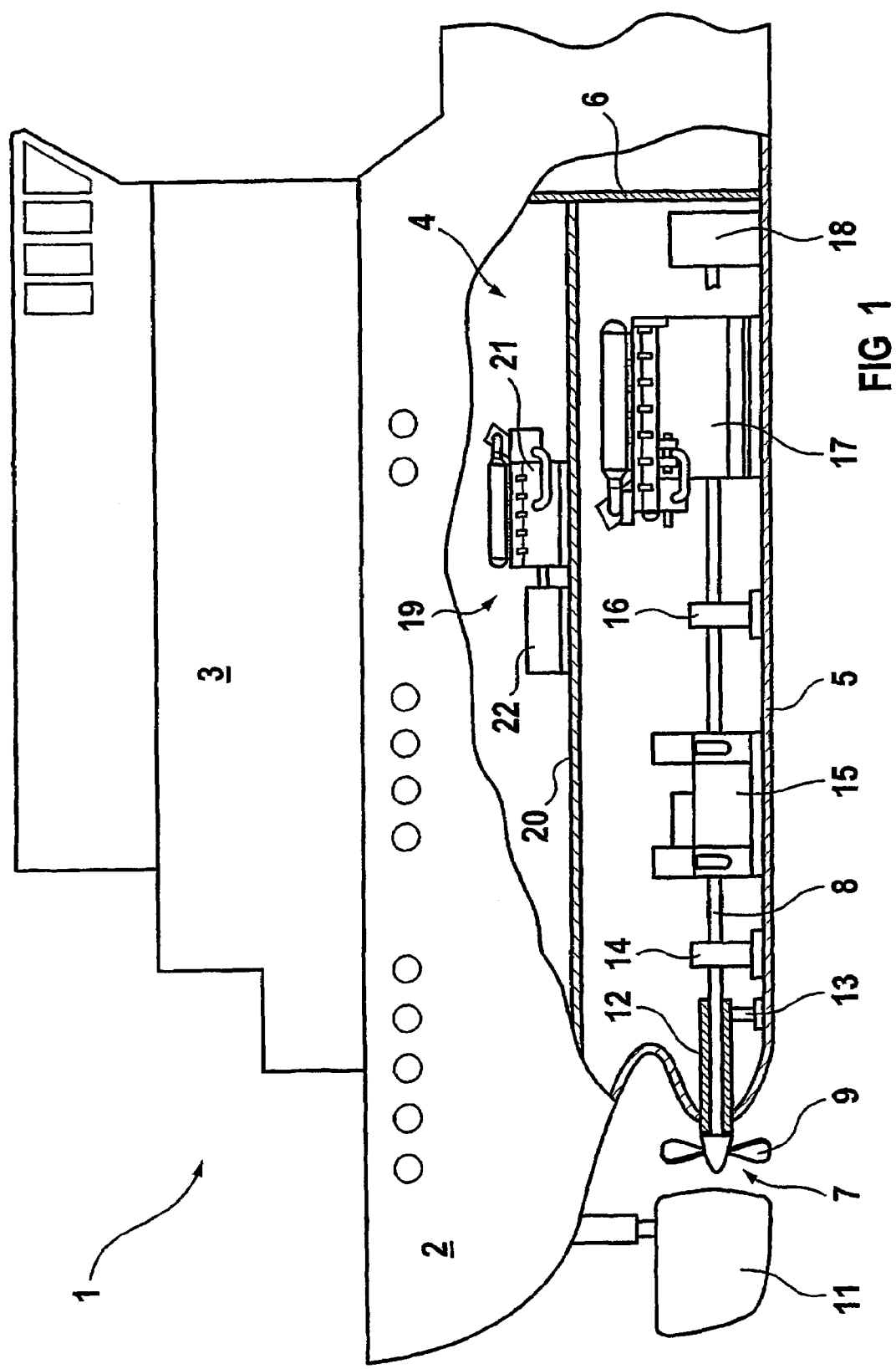
FIG. 1 shows a ship which is equipped with the hybrid propulsion system according to an embodiment of the invention, in the form of a highly schematic longitudinal section.

FIG. 1 shows a highly schematic illustration of a container ship 1 with a ship's hull 2 and a superstructure 3. The ship's hull 2 is cut away in the area of an engine room 4. The illustration is not to scale at all, with the only aim being to show the essential items.

The engine room 4 has an engine room deck 5 and is closed in the forward direction, in the direction of the ship's bow, by a bulkhead 6. It is closed in the rearward direction by the corresponding stern part of the ship 1. A ship propeller 7 is arranged in a known manner in an area of the stern that is shown, and is connected to a propeller shaft 8 such that they rotate together. The ship propeller 7 is what is referred to as a variable-pitch propeller, that is to say a propeller with propeller blades 9 whose pitch can be varied. A rudder 11 is fitted downstream from the propeller 9, such that it can swivel.

The propeller shaft 8 passes through a propeller shaft pipe 12, which is supported by at least one support 13 in the interior of the ship. The propeller shaft pipe 12 is followed by a radial bearing 14, which is likewise mounted on the engine room deck 5 and is used to absorb some of the radial force of the ship's shaft 8. As it continues, seen in the direction of the bow of the ship 1, there is an electric motor 15, whose rotor shaft is formed by the propeller shaft 8.

The electric motor 15 may be a synchronous machine, an asynchronous machine or a DC machine. In any case, it is a slow-running motor, which preferably acts directly on the propeller shaft 8, without any intermediate gearbox.

Finally, the propeller shaft 8 is also supported by a further bearing 16, which is likewise mounted on the engine room deck 5 and absorbs the axial forces and radial forces, that is to say the thrust produced by the propeller 7.

Finally, at the end, the propeller shaft 8 is connected to a slow-running main diesel engine 17, whose crankshaft drives the propeller shaft 8 either directly or via single-stage step-down gearing. The main diesel engine 17 is a two-stroke diesel engine and typically has a rated power of at least between 8 and 13 MW. The present-day power range for single engines extends up to about 70 MW for cargo ships.

A schematically indicated control drive 18 is provided for controlling the ship propeller 7.

The power supply for the electric motor 15 is provided by a diesel generator set 19 which, in the illustrated exemplary embodiment, is arranged on a gallery deck 20 in the engine room 4. This diesel generator set 19 has a diesel engine 21 as well as an electricity generator 22. The diesel engine 21 is a high-speed diesel engine which operates on the four-stroke principle.

Two or more diesel generator sets may also be used instead of a single diesel generator set 18, and are connected in order to supply electricity depending on the power demand.

The electric motor 15 and the main diesel engine 17 form a hybrid propulsion system for the ship propeller 7. The rated power of the electric motor 15 represents at least 20 percent of the rated power that the main diesel engine 17 can emit. Thus, when the maximum torque is applied to the ship propeller 7, approximately 20 percent of the torque is provided by the electric motor 15, while the rest is produced by the main diesel engine 17.

The illustration in FIG. 1 is not to scale to the extent that the volume of the main diesel engine 17 is very much greater than the volume of the diesel engine 21 for the diesel generator set 19, but it would be virtually impossible to show this in comparison to the main diesel engine 17.

The electric motor 15 is operated during every operating phase of the ship propulsion system and is controlled overall such that the main diesel engine 17 is thermally loaded as little as possible and/or has as good a fuel consumption as possible.

Figure 2:
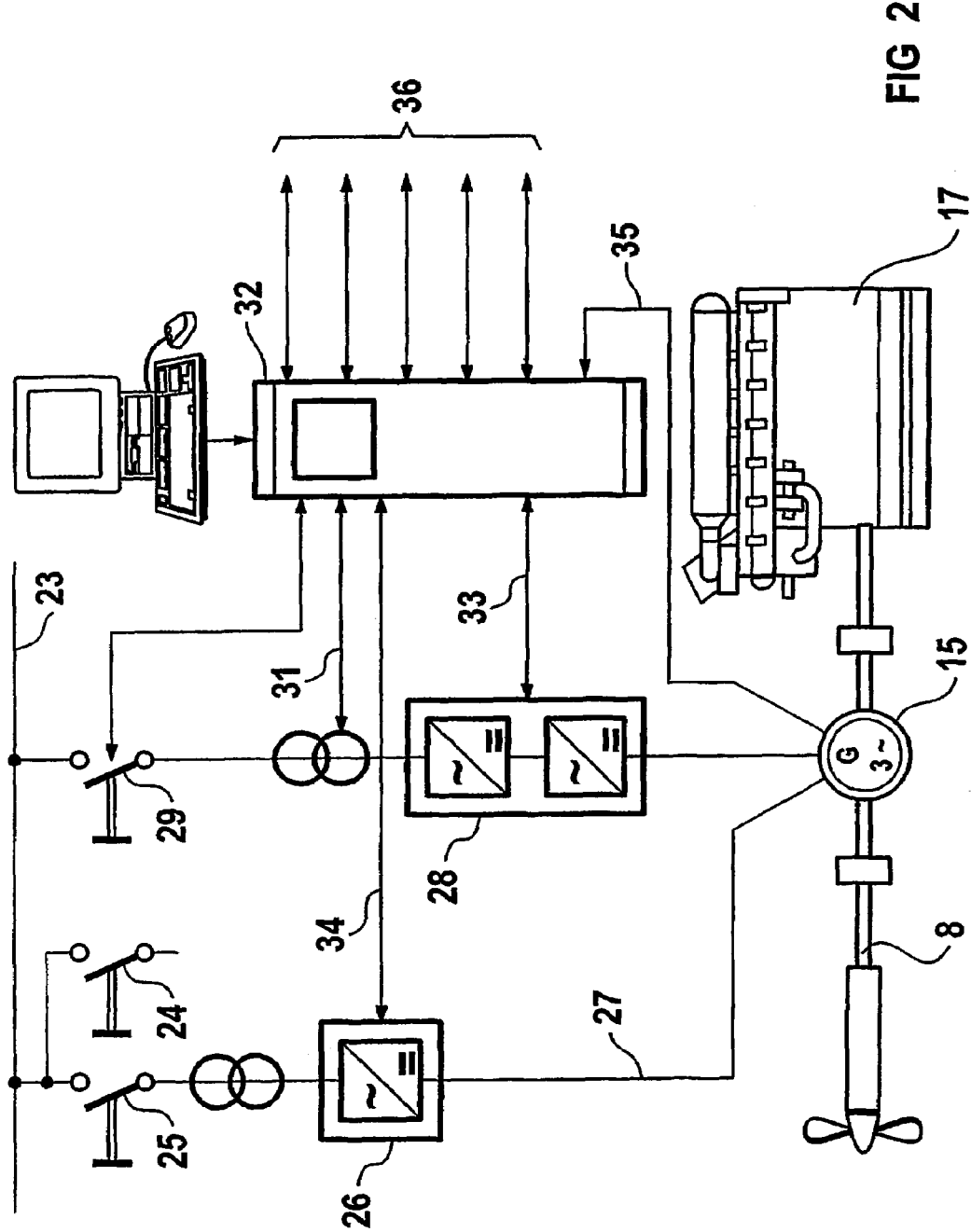
FIG. 2 shows the outline circuit diagram of the hybrid propulsion system according to an embodiment of the invention.

The electrical equipment for operating the hybrid propulsion system is shown in highly schematic form in FIG. 2.

The diesel set 19 feeds its electrical power to an electrical power supply system 23. Electrical power for further electrical devices is tapped off from the power supply system 23 via a switch 24. The power supply system 23 is also connected via a switch 25 to a converter 26, which produces field energy for the electric motor 15 via a cable 27. The field energy for a synchronous machine is produced via a converter 28, which is likewise connected to the power supply system 23 via a switch 29. The electrical power for the electric motor 15 is measured at the input of the converter 28, and is passed to a central controller 32, by means of a control line 31.

The central controller 32 uses a control line 33 to control the converter 28, and a control line 34 to control the converter 26. Via a line 35, the central controller 32 also detects the rotation speed of the electric motor 15, that is to say of the propeller shaft 8.

The central controller 32 is also connected via lines 36 to the command bridge, an alarm system, a remote maintenance device and other such devices. The central controller 32 also determines the fuel consumption of both the main diesel engine 17 and of the diesel set 18 and controls the entire system so that the overall fuel consumption is optimized. Finally, the central controller 32 also provides the control function for the control drive 18.

The hybrid propulsion system according to the invention occupies a very small amount of space in comparison to the main diesel engine 17. It is therefore possible to upgrade existing seagoing ships with the hybrid propulsion system according to an embodiment of the invention. This upgrading is carried out without the engine room occupying any larger amount of space. The additional facilities, such as the electric motor 15 and the diesel set 18, can be accommodated without any problems in the dead space in the engine room which is not used by the main diesel engine 17.

By way of example, it is thus possible to convert an existing seagoing ship to a ship which is capable of passing through ice, or even into an icebreaker. The propulsion power is stepped up for this purpose by additionally coupling an electric motor to the respective propeller shaft. If this has not already been done, the ship propeller is converted to a variable-pitch propeller, and the additionally required diesel generator set is installed. The propeller shaft pipe and the shaft bearings may possibly need to be reinforced, to match the increased propulsion power.

The bow, the bottom of the ship in the bow area and the flanks of the ship must, of course, also be reinforced for a ship which is capable of passing through ice or for an icebreaker.

The hybrid propulsion system concept according to an embodiment of the invention also makes it possible to increase the propulsion power retrospectively for an existing ship. This can be done in order to achieve higher cruise speeds. This is done by converting the propulsion system of the ship in the same way as that already explained above.

Finally, it is feasible to use the hybrid propulsion system according to an embodiment of the invention to increase the propulsion power to such an extent that it is possible to enlarge or lengthen the ship's hull in order to increase the cargo area, with the same cruise speed.

The propulsion system concept according to an embodiment of the invention can be used not just for single-shaft systems but also for multishaft systems. Furthermore, it is also feasible for the electric motor to be coupled to the propeller shaft via a gearbox rather than being arranged directly on the propeller shaft. Finally, it is feasible for the electric motor to be coupled to the crankshaft of the main diesel engine, to be precise on the opposite side from the propeller shaft.

If single-stage gearing is connected between the electric motor and the propeller shaft, it may be possible to use an even smaller electrical machine in some circumstances. A hybrid propulsion system includes a main diesel engine for driving the ship's shaft, and an electric motor. The electric motor has a rated power which corresponds to at least 20% of the rated power of the main diesel engine. The electric motor is switched on all the time and, in conjunction with a variable-pitch propeller, ensures that the main diesel engine is kept at an advantageous optimum operating point. The combination of the main diesel engine and the electrical drive thus, overall, allows more economic construction and operation.

Exemplary embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A ship propulsion system, comprising:
   at least one ship propeller, driven via a propeller shaft;
   a slow-running main diesel engine of a rated power, coupled to the propeller shaft in order to supply power to the ship propeller;
   an electric motor of a rated power, coupled to the propeller shaft in order to supply power to the ship propeller;
   an electricity generator system for producing electrical power for the electric motor; and
   a fast-running diesel system for driving the electricity generator system,
   wherein a pitch of propeller blades of the ship propeller is variable by a control drive, and
   wherein the ship propulsion system includes a control device for controlling torque to be emitted from the electric motor and the ship propeller, such that the slow-running main diesel engine is operable at a nearly optimum operating point.

2. The ship propulsion system as claimed in claim 1, further comprising a control device in order to control torque emitted from the electric motor such that the slow-running main diesel engine is operated at the nearly optimum operating point.

3. The ship propulsion system as claimed in claim 1, wherein the electric motor is torque-controlled.

4. The ship propulsion system as claimed in claim 1, wherein the rated power of the electric motor is at least 20% of the rated power of the main diesel engine.

5. A method for increasing propulsion power of a ship including at least one electric motor, including at least one shaft system with a propeller shaft for driving a ship propeller, and at least one slow-running main diesel engine for driving the propeller shaft, the method comprising:
   providing an electric motor;
   installing a diesel generating system;
   matching the shaft system to the total power of the electric motor and of the slow-running main diesel engine; and
   installing an electrical control and regulation device, to control the torque which is to be emitted from the electric motor and the ship propeller, such that the slow-running main diesel engine is operable at a nearly optimum operating point.

6. A method for upgrading a seagoing ship, the method comprising:
   upgrading a ship propulsion system of the ship with a ship propulsion system as claimed in claim 1; and
   reinforcing the ship's hull in order to make the seagoing ship capable of passing through ice.

7. A method for upgrading a seagoing ship, the method comprising:
   upgrading a ship propulsion system of the ship with a ship propulsion system as claimed in claim 1; and
   replacing the ship propeller by a ship propeller whose propeller blades are controllable, wherein a control drive is installed for the propeller blades.

8. The ship propulsion system as claimed in claim 1, wherein the rated power of the slow-running main diesel engine and of the electric motor are predeterminable.

9. The ship propulsion system as claimed in claim 1, wherein the optimum operating point is predeterminable.

10. A ship propulsion system, comprising:
    at least one ship propeller, adapted to be driven via a propeller shaft;
    a diesel engine of a rated power, coupled to the propeller shaft and adapted to supply power to the ship propeller;
    an electric motor of a rated power, coupled to the propeller shaft and adapted to supply power to the ship propeller;
    an electricity generator system, adapted to produce electrical power for the electric motor; and
    a diesel system, adapted to drive the electricity generator system, wherein a pitch of propeller blades of the ship propeller is variable by a control drive, and wherein the ship propulsion system includes a control device, adapted to control torque of the electric motor and the ship propeller, such that the diesel engine is operable at a nearly optimum operating point.

11. The ship propulsion system as claimed in claim 10, wherein the diesel engine is relatively slow running in comparison with the diesel system.

12. The ship propulsion system as claimed in claim 10, wherein the electric motor is torque-controlled.

13. The ship propulsion system as claimed in claim 10, wherein the rated power of the electric motor is at least 20% of the rated power of the diesel engine.

14. The ship propulsion system as claimed in claim 13, wherein the diesel engine is relatively slow running in comparison with the diesel system.

* * * * *